United States Patent [19]
Thomas

[11] Patent Number: 6,125,823
[45] Date of Patent: Oct. 3, 2000

[54] SYSTEM AND METHOD FOR CONTROLLING FUEL INJECTIONS

[75] Inventor: Eric D. Thomas, Canton, Mich.

[73] Assignee: Detroit Diesel Corporation, Detroit, Mich.

[21] Appl. No.: 09/321,045

[22] Filed: May 27, 1999

[51] Int. Cl.$^7$ .................................................. F02D 41/40
[52] U.S. Cl. .................. 123/464; 123/299; 123/457; 123/478; 123/480; 701/104
[58] Field of Search .................... 123/299, 300, 123/357, 358, 446, 457, 458, 464, 478, 480; 701/104

[56] References Cited

U.S. PATENT DOCUMENTS

| | | | |
|---|---|---|---|
| 4,223,654 | 9/1980 | Wessel et al. | 123/358 |
| 4,329,951 | 5/1982 | Seilly | 123/491 X |
| 4,426,983 | 1/1984 | Seilly et al. | 123/506 |
| 4,459,955 | 7/1984 | Adey et al. | 123/357 |
| 5,131,371 | 7/1992 | Wahl et al. | 123/436 |
| 5,165,373 | 11/1992 | Cheng | 123/300 |
| 5,197,438 | 3/1993 | Yamamoto | 123/506 |
| 5,201,294 | 4/1993 | Osuka | 123/458 |
| 5,231,962 | 8/1993 | Osuka et al. | 123/299 |
| 5,313,924 | 5/1994 | Regueiro | 123/456 |
| 5,402,760 | 4/1995 | Takeuchi et al. | 123/300 |
| 5,445,128 | 8/1995 | Letang et al. | 123/436 |
| 5,477,827 | 12/1995 | Weisman, II et al. | 123/436 |
| 5,507,266 | 4/1996 | Wright et al. | 123/497 |
| 5,615,654 | 4/1997 | Weisman, II et al. | 123/350 |
| 5,647,317 | 7/1997 | Weisman, II et al. | 123/299 |
| 5,694,902 | 12/1997 | Miwa et al. | 123/493 |
| 5,771,861 | 6/1998 | Musser et al. | 123/357 |
| 5,771,865 | 6/1998 | Ishida | 123/467 |
| 6,016,791 | 1/2000 | Thomas et al. | 123/497 |

*Primary Examiner*—Tony M. Argenbright
*Attorney, Agent, or Firm*—Brooks & Kushman P.C.

[57] ABSTRACT

A system and method for controlling fuel delivery from a fuel injector includes determining engine speed, determining a proposed pilot pulse width time based on engine speed, determining injection pressure, determining a proposed first quantity of fuel to be delivered by the fuel injector based on the proposed pilot pulse width time and injection pressure and determining a desired engine torque output. A desired total quantity of fuel to be delivered by the fuel injector is determined based on the desired engine torque output and engine speed. The proposed first quantity of fuel is compared with the desired total quantity of fuel. A desired first quantity of fuel to be delivered by the fuel injector is determined based on the desired engine torque output and engine speed if the proposed first quantity of fuel is greater than the desired total quantity of fuel. A desired pilot pulse width time is determined based on the desired first quantity of fuel and the injection pressure. A desired second quantity of fuel to be delivered by the fuel injector is determined by subtracting the proposed first quantity of fuel from the desired total quantity of fuel if the proposed first quantity of fuel is less than or equal to the desired first quantity of fuel. A main pulse width time is determined based on the desired second quantity of fuel and the injection pressure.

27 Claims, 2 Drawing Sheets

SYSTEM AND METHOD FOR CONTROLLING FUEL INJECTIONS

TECHNICAL FIELD

The invention relates to a system and method for controlling fuel injection of fuel injectors in an internal combustion engine.

BACKGROUND ART

A prior fuel injection system includes a common fuel rail and a plurality of fuel injectors in communication with the fuel rail for injecting fuel into a plurality of cylinders of an internal combustion engine. Each of the fuel injectors has an electronic control valve or solenoid for controlling fuel injection into a particular cylinder. An electronic control unit, or controller, is used to control the electronic control valves, as well as other aspects of the fuel injection system. The controller may include volatile and non-volatile memory, input and output driver circuitry, and a processor capable of executing one or more stored instruction sets. In operation, the controller determines an excitation or energizing duration for each control valve corresponding to current engine conditions. Energizing of a particular control valve causes the valve to open, which allows fuel injection to occur. However, imprecise determination of energizing durations may result in operating problems such as engine noise and excessive engine emissions.

A prior method for determining energizing durations by a controller involves determining a desired injection pressure and a raw injection duration, or raw pulse width, from two separate but interdependent look-up tables that each reference desired engine torque and engine speed. The raw injection duration is not based on time units, however, but rather is based on angular displacement of the engine crankshaft measured in degrees. The raw injection duration is then adjusted to establish a final injection duration based on injection pressure error, which is a function of desired injection pressure and observed or actual injection pressure. Finally, the final injection duration is converted from degrees to time to establish an energizing duration, and a corresponding control signal is sent to a particular fuel injector.

Because this method involves interdependent look-up tables for determining desired injection pressure and raw injection duration, calibration of the look-up tables and associated controller is difficult and time-consuming. Furthermore, desired injection pressure values, which are used to control a fuel pump, cannot be independently varied so as to optimally adapt injection pressure to variable operating conditions such as air temperature.

Several methods have been proposed to enhance fuel injection capabilities. One such method is known as split injection. Split injection consists of a first injection, called the pilot injection, followed by a delay, and then a second injection, referred to as the main injection. When performing split injection, precise determination of energizing durations for both the pilot injection and the main injection is essential. Many times, operating conditions at which split injection may be performed are restricted to lower engine speeds due to difficulties in establishing precise energizing durations.

Another method for determining pilot and main energizing durations is similar to the method previously described. The method involves determining a desired injection pressure based on a desired engine torque output and engine speed; determining a raw pilot injection duration, or raw pilot pulse width, based on a desired pilot engine torque output and engine speed; and determining a raw main injection duration, or raw main pulse width, based on a desired main engine torque output and engine speed. As in the above method, the raw injection durations are not based on time units, but rather are represented in degrees of rotation of the crankshaft. Furthermore, the desired injection pressure and the raw injection durations are determined in parallel from separate, but interdependent, look-up tables. The raw pilot injection duration and the raw main injection duration are then adjusted to establish a final pilot injection duration and a final main injection duration, respectively, based on injection pressure error. Next, the final pilot injection duration and the final main injection duration are converted from degrees to time to establish a pilot energizing duration and a main energizing duration, respectively, and corresponding control signals are sent to a particular fuel injector.

DISCLOSURE OF THE INVENTION

It is therefore an object of the invention to provide a method and system for controlling fuel delivery from a fuel injector based on pulse widths that are more precisely determined as compared with prior methods and systems.

Another object of the invention is to provide a method and system for determining pulse widths in time units independently of angular measurements associated with an engine crankshaft.

In carrying out the above objects and other objects and features of the invention, a method for controlling fuel delivery from a fuel injector includes determining a proposed first pulse width time; determining a proposed first quantity of fuel to be delivered by the fuel injector based on the proposed first pulse width time; determining a desired total quantity of fuel to be delivered by the fuel injector; comparing the proposed first quantity of fuel with the desired total quantity of fuel; and utilizing the proposed first pulse width time for controlling the fuel injector if the proposed first quantity of fuel is less than or equal to the desired total quantity of fuel.

Preferably, the proposed first pulse width time is based on engine speed, the proposed first quantity of fuel is further based on injection pressure, and the desired total quantity of fuel is based on engine speed and desired engine torque output.

In addition, the method preferably includes determining a desired second quantity of fuel to be delivered by the fuel injector if the proposed first quantity of fuel is less than the desired total quantity of fuel. A second pulse width time is then determined based on the desired second quantity of fuel.

If the proposed first quantity of fuel is greater than the desired total quantity of fuel, then the method preferably further includes determining a desired first pulse width time based on the desired total quantity of fuel, and utilizing the desired first pulse width time to control the fuel injector.

According to a feature of the invention, the method may also include determining a desired injection pressure independently of determining the proposed pulse width time, and controlling a fuel pump system for supplying fuel to the fuel injector based on the difference between the desired injection pressure and actual injection pressure. Preferably, the desired injection pressure may be altered independently of the proposed pulse width time based on dynamic engine operating parameters. As a result, the fuel pump system may be effectively controlled to optimize fuel pressure to thereby optimize engine operation.

More specifically, a method according to the invention for controlling fuel delivery from a fuel injector includes determining engine speed; determining a proposed pilot pulse width time based on engine speed; determining injection pressure; determining a proposed first quantity of fuel to be delivered by the fuel injector based on the proposed pilot pulse width time and injection pressure; determining a desired engine torque output; determining a desired total quantity of fuel to be delivered by the fuel injector based on the desired engine torque output and engine speed; comparing the proposed first quantity of fuel with the desired total quantity of fuel; determining a desired first quantity of fuel to be delivered by the fuel injector based on the desired engine torque output and engine speed if the proposed first quantity of fuel is greater than the desired total quantity of fuel; determining a desired pilot pulse width time based on the desired first quantity of fuel and the injection pressure; determining a desired second quantity of fuel to be delivered by the fuel injector by subtracting the proposed first quantity of fuel from the desired total quantity of fuel if the proposed first quantity of fuel is less than or equal to the desired first quantity of fuel; and determining a main pulse width time based on the desired second quantity of fuel and the injection pressure.

A system is also provided for controlling fuel delivery from a fuel injector having an electronic control valve, wherein the fuel injector is in communication with a fuel rail. The system comprises an accelerator pedal sensor for sensing pedal position, a crankshaft sensor for sensing rotational speed of the crankshaft, and a fuel pressure sensor for measuring fuel pressure in the fuel rail. The system further includes a controller in communication with the accelerator pedal sensor, the crankshaft sensor, the fuel pressure sensor and the electronic control valve. The controller includes instructions for determining a desired engine torque output based on the pedal position, instructions for determining engine speed based on the rotational speed of the crankshaft, instructions for determining a proposed first pulse width time, instructions for determining a proposed first quantity of fuel to be delivered by the fuel injector based on the proposed first pulse width time, instructions for determining a desired total quantity of fuel to be delivered by the fuel injector, instructions for comparing the proposed first quantity of fuel with the desired total quantity of fuel, and instructions for utilizing the proposed first pulse width time for controlling the fuel injector if the proposed first quantity of fuel is less than or equal to the desired total quantity of fuel.

The above objects and other objects, features and advantages of the invention are readily apparent from the following detailed description of the best modes for carrying out the invention when taken in conjunction with the accompanying drawings.

BEST MODE FOR CARRYING OUT THE INVENTION

Figure 1:
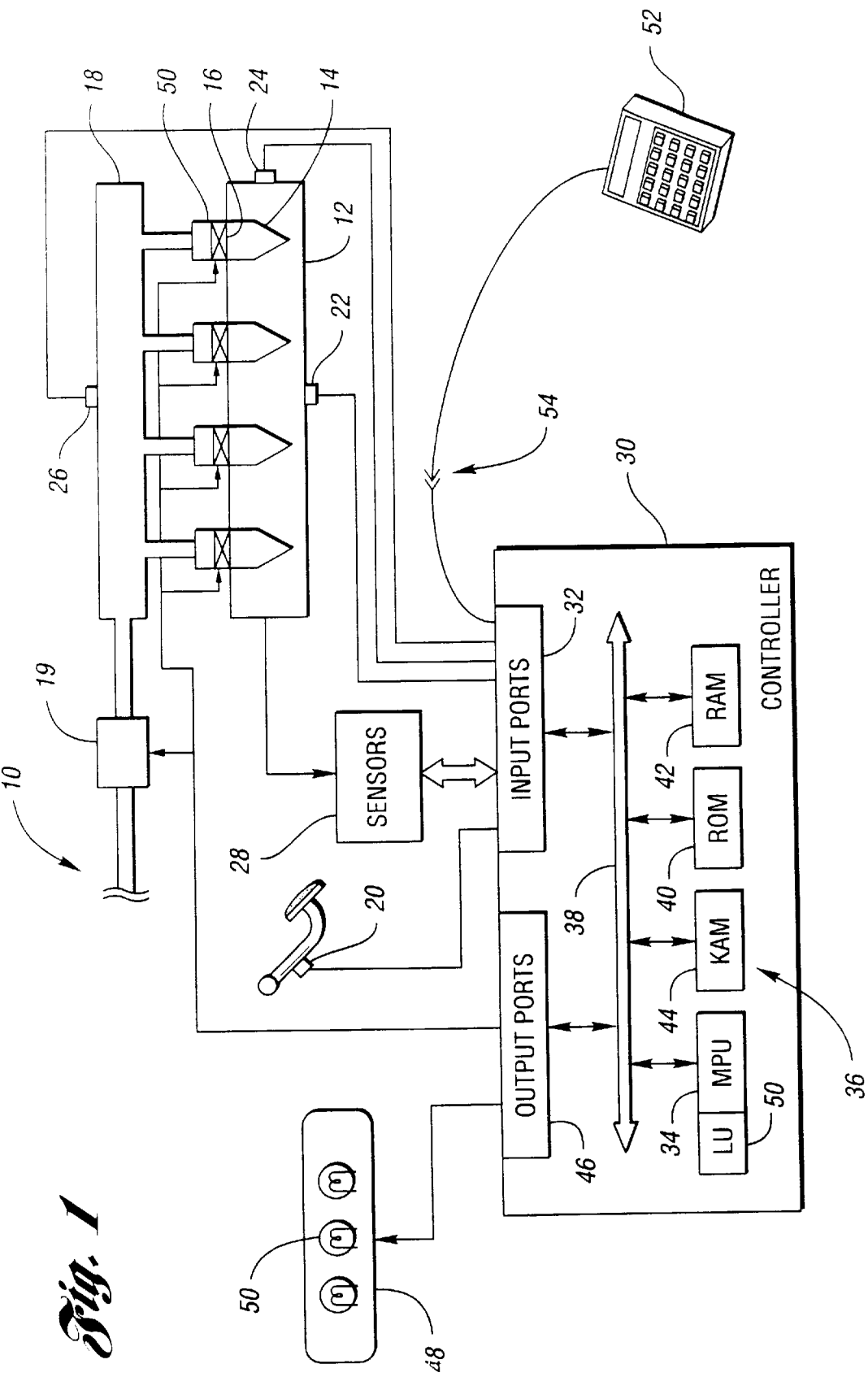
FIG. 1 is a schematic diagram of one embodiment of a system for controlling fuel injection according to the invention.

Referring now to FIG. 1, a system for controlling fuel delivery according to the present invention is shown. The system, generally indicated by reference numeral 10, includes an engine 12 having a plurality of cylinders, each of which is fed by one of a plurality of fuel injectors 14. In a preferred embodiment, engine 12 is a compression-ignition internal combustion engine, such as a four, six, eight, twelve, sixteen, twenty, or twenty-four-cylinder diesel engine. Each of the fuel injectors 14 preferably has an electronic control valve 16 (such as a solenoid, for example) for controlling injection into a particular cylinder. The fuel injectors 14 receive pressurized fuel from a common rail 18, which is connected to one or more high or low pressure fuel pumps, such as fuel pump 19, as is well known in the art. Alternatively, embodiments of the present invention may employ a plurality of unit pumps (not shown), each pump supplying fuel to one of the injectors 14.

The system 10 further includes an accelerator pedal sensor 20 for sensing pedal or throttle position, a temperature sensor 22 for sensing engine temperature, a crankshaft sensor 24 for sensing rotational speed of the crankshaft (not shown), and a fuel pressure sensor 26 for sensing fuel pressure in the rail 18. The system 10 may also include various other sensors 28 for generating signals indicative of corresponding operating conditions or parameters of engine 12, a vehicle transmission (not shown), and/or other vehicular components. For example, the sensors 28 may generate signals corresponding to such parameters as battery voltage, fuel temperature, ambient air temperature, and ambient air pressure. The sensors 20–28 are in electrical communication with a controller 30 via input ports 32. The controller 30 preferably includes a microprocessor 34 in communication with various computer readable storage media 36 via data and control bus 38. The computer readable storage media 36 may include any of a number of known devices which function as a read-only memory (ROM) 40, random access memory (RAM) 42, keep-alive memory (KAM) 44, and the like. The computer readable storage media 30 may be implemented by any of a number of known physical devices capable of storing data representing instructions executable via a computer such as controller 30. Known devices may include, but are not limited to, PROM, EPROM, EEPROM, flash memory, and the like in addition to magnetic, optical, and combination media capable of temporary or permanent data storage.

The computer readable storage media 36 include data representing program instructions (software), calibrations, operating variables and the like that are used in conjunction with associated hardware to effect control of various systems and subsystems of the vehicle, such as the engine 12, vehicle transmission, and the like. With respect to fuel delivery, the controller 30 receives signals from sensors 20–28 via input ports 32, and generates output signals that may be provided to various actuators and/or components, such as the electronic control valves 16 and pump 19, via output ports 46. Signals may also be provided to a display device 48, which may include various indicators such as lights 50 to communicate information relative to system operation to the operator of the vehicle. Of course, alphanumeric, audio, video, or other displays or indicators may be utilized if desired.

A data, diagnostics, and programming interface 52 may also be selectively connected to controller 30 via a plug 54 to exchange various information therebetween. Interface 52 may be used to change values within the computer readable storage media 36, such as configuration settings, calibration variables including adjustment factor look-up tables, control logic, temperature thresholds for enabling or disabling split injection, and the like.

In operation, controller 30 receives signals from sensors 20–28 and executes or implements control logic embedded in hardware and/or software to control fuel delivery to the engine 12 by controlling fuel pressure in the rail 18 and actuation of the electronic control valves 16. Furthermore, the controller 22 preferably implements control logic to determine the injection mode, such as split injection or single injection, depending on user preferences and/or current operating conditions. Split injection involves a first injection, known as a pilot injection, followed by a delay, and then a second injection, known as a main injection. Controller 22 is preferably capable of smooth transitions between injection modes under various operating conditions. The control logic is preferably implemented by the microprocessor 34 as described below in further detail. However, various alternative hardware and/or software may be used to implement the control logic without departing from the spirit or scope of the invention. In a preferred embodiment, the controller 30 is a Detroit Diesel Electronic Controller (DDEC) available from Detroit Diesel Corporation, Detroit, Mich.

Figure 2:
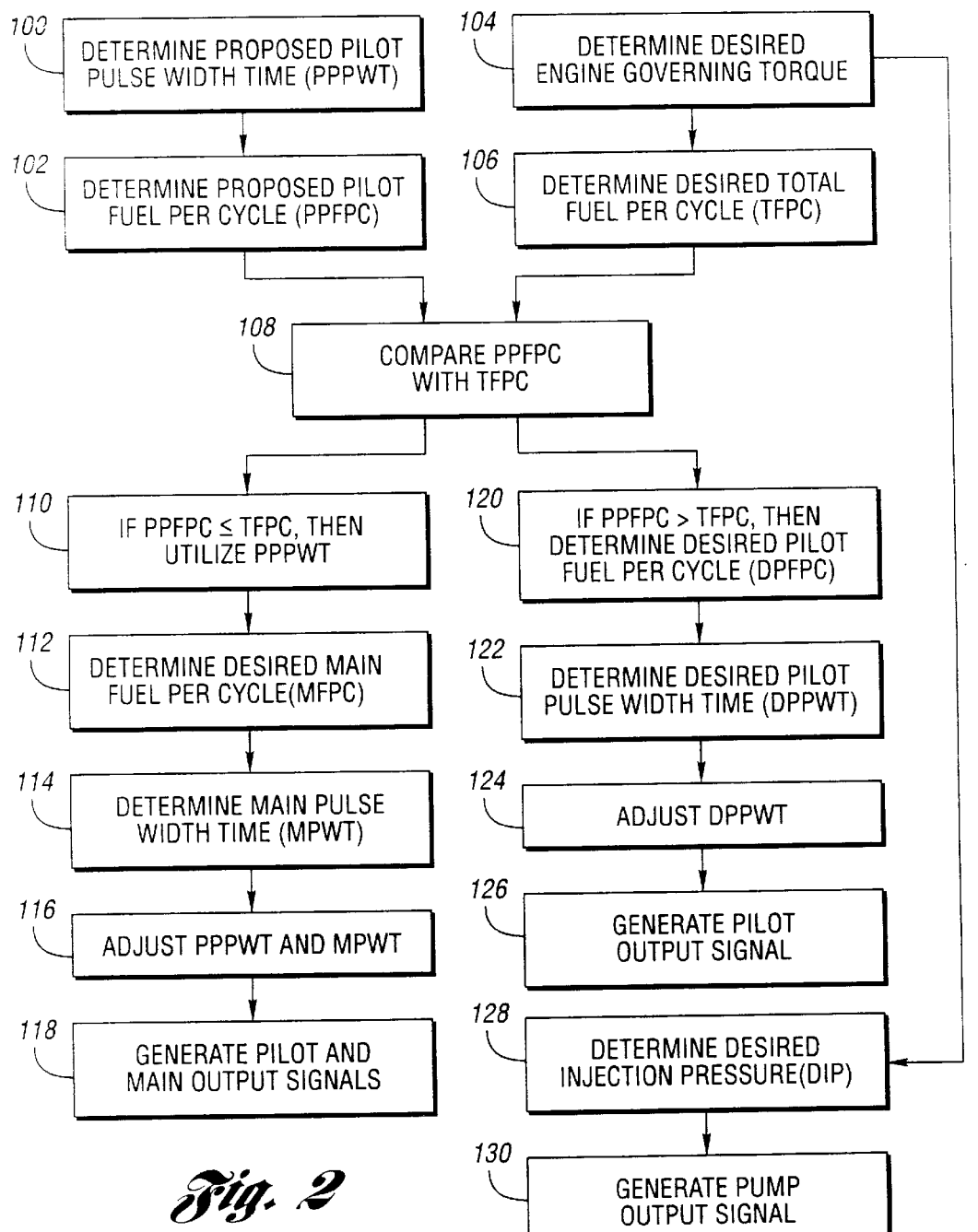
FIG. 2 is a flow chart illustrating operation of a system or method according to the present invention for controlling fuel injection, wherein the system or method includes controlling a fuel pump system based on the difference between desired injection pressure and actual injection pressure.

FIG. 2 is a flow chart illustrating operation of a method or system, such as system 10, for controlling fuel delivery according to the present invention. As will be appreciated by one of ordinary skill in the art, the flow chart represents control logic which may be effected or implemented by hardware, software, or a combination of hardware and software. The various functions are preferably implemented by a programmed microprocessor such as included in the DDEC controller. Alternatively, one or more of the functions may be implemented by dedicated electric, electronic, or integrated circuits. As will also be appreciated, the control logic may be implemented using any one of a number of known programming and processing techniques or strategies and is not limited to the order or sequence illustrated here for convenience only. For example, interrupt or event driven processing is typically employed in real-time control applications, such as control of a vehicle engine or transmission. Likewise, parallel processing or multi-tasking systems and methods may be used to accomplish the objects, features, and advantages of the present invention. The present invention is independent of the particular programming language, operating system, or processor used to implement the control logic illustrated.

At step 100 of FIG. 2, a proposed pilot pulse width time (PPPWT) is determined based on one or more operating conditions, such as engine speed measured in revolutions per minute (RPM) of the crankshaft. The PPPWT is determined in time units and is not dependent on angular displacement of the crankshaft. Preferably, the PPPWT is found in a look-up table that references engine RPM. Alternatively, PPPWT may be a fixed value.

At step 102, a proposed first or pilot quantity of fuel to be delivered during the pilot injection, or proposed pilot fuel per cycle (PPFPC), is determined based on the PPPWT and one or more engine operating parameters such as observed or actual fuel pressure in, for example, rail 18 (shown in FIG. 1). The actual fuel pressure is also referred to as actual injection pressure. Preferably, the PPFPC is found in a look-up table that references PPPWT and actual fuel pressure.

At step 104, a desired engine governing torque (EGT) is determined based on various operating conditions such as throttle position and/or transmission gear ratio. Alternatively, EGT may be determined by a variable speed governor. Next, a desired total quantity of fuel to be delivered during both the pilot and main injections, or total fuel per cycle (TFPC) is determined at step 106. The TFPC is determined based on EGT and one or more engine operating parameters such as engine RPM. Preferably, the TFPC is found in a look-up table that references EGT and engine RPM, and the look-up table is preferably calibrated to correspond to the fuel efficiency of the engine 12.

At step 108, PPFPC is compared with TFPC. If PPFPC is less than or equal to TFPC, as represented at step 110, then PPPWT is utilized to control the pilot injection of a particular fuel injector 14, shown in FIG. 1, as described below in greater detail.

At step 112, a desired second or main quantity of fuel to be delivered during the main injection, or main fuel per cycle (MFPC) is determined by subtracting the PPFPC from the TFPC. Next, a main pulse width time (MPWT) is determined at step 114 based on the MFPC and one or more engine operating parameters such as actual fuel pressure in, for example, the rail 18 (shown in FIG. 1). Advantageously, the MPWT is determined in time units and is not dependent on angular displacement of the crankshaft. The MPWT is preferably found in a look-up table that references MFPC and actual injection pressure. Furthermore, this look-up table is preferably calibrated for a particular fuel injector 14.

Under this scenario, i.e., PPFPC less than or equal to TFPC, pilot and main injections are controlled, such as by the controller 30 shown in FIG. 1, based on the PPPWT and the MPWT. Control logic may be applied to the PPPWT and/or the MPWT to adjust these values, as represented in FIG. 2 at step 116 based on engine operating parameters such as fuel pressure, engine temperature, ambient air temperature and ambient air pressure. Next, a pilot output signal and a main output signal are generated at step 118 based on the PPPWT and the MPWT, respectively. The output signals represent energizing durations and are used to energize a particular electronic control valve 16, show in FIG. 1, in order to deliver the PPFPC during the pilot injection, and the MFPC during the main injection. The output signals may also be generated based on additional factors such as actuation latency of the electronic control valves 16, and delay in lifting of associated spray tip needles. Furthermore, an inter-pulse gap between the pilot injection and the main injection is also determined. Additional details regarding fuel injection timing may be found in application Ser. No. 09/156,246, U.S. Pat. No. 6,032,642, which is assigned to the assignee of the present invention and is hereby incorporated by reference. It should be noted that although the time periods (PPPWT, MPWT and related energizing durations) associated with the pilot and main injections are determined in time units, initiation of these time periods is still preferably dependent on crankshaft orientation so that the injections may be completed at the appropriate time relative to piston position.

If PPFPC is greater than TFPC, then the PPPWT is not utilized to control fuel injection from a particular fuel injector 14. Instead, a desired quantity of fuel to be delivered during the pilot injection, or desired pilot fuel per cycle (DPFPC) is determined at step 120. The DPFPC is determined based on EGT and one or more engine operating parameters such as engine RPM. Preferably, the DPFPC is found in a look-up table that references EGT and engine RPM, and the look-up table is preferably calibrated to correspond to the fuel efficiency of the engine 12.

Next, a desired pilot pulse width time (DPPWT) is determined at step 122. The DPPWT is based on DPFPC and one or more engine operating parameters such as actual fuel pressure in, for example, the rail 18. Advantageously, the DPPWT is determined in time units and is not dependent on angular displacement of the crankshaft. The DPPWT is preferably found in a look-up table that references DPFPC and actual fuel pressure, and the look-up table is preferably calibrated for a particular fuel injector 14. Similar to the process described above with respect to the PPPWT and the MPWT, control logic may be applied to the DPPWT to adjust this value, as represented in FIG. 2 at step 124, based on engine operating parameters such as fuel pressure, engine temperature, ambient air temperature and ambient air pressure. Next, a pilot output signal is generated at step 126 based on the DPPWT. The pilot output signal represents an energizing duration and is used to energize a particular electronic control valve 16, show in FIG. 1, in order to deliver the DPFPC during the pilot injection. Under this scenario, i.e., PPFPC greater than DTFPC, preferably only a single or pilot injection will occur, and the main injection duration is reduced to zero.

If the particular fuel injector 14 is operating in single injection mode only, then steps 100, 102 and 106–118 may be omitted. Instead, a DPFPC, DPPWT and corresponding output signal may be determined as previously described. The output signal represents an energizing duration and is used to energize a particular electronic control valve 16, show in FIG. 1, in order to deliver the DPFPC during the single injection.

Because pulse width times are determined in time units under the present invention, the pulse width times are more precise than prior pulse widths that are based on angular displacement of the engine crankshaft when the injection pressure is provided by a common rail. As a result, fuel injection may be precisely controlled so as to optimize engine operation. Furthermore, because the quantities of fuel per injection cycle are determined independently of angular displacement of the engine crankshaft, estimated fuel consumption may be determined more precisely than prior methods.

The system and method of the present invention also provide optimum control of fuel injection arrangements that are capable of detecting injector response time. Because the PPPWT is a proposed value, it can be established as a sufficiently large value to ensure that enough time is available for accurate detection of injector response time. Consequently, injector latencies can be accurately measured and compensated for using the method and system according to the invention.

Advantageously, each of the look-up tables mentioned above is preferably independently calibrated. In other words, the look-up tables are not mapped against each other. Consequently, each of the look-up tables may be recalibrated as needed without affecting the other look-up tables.

Another aspect of controlling fuel delivery involves controlling fuel pressure. This is preferably accomplished by controlling a fuel pump system, such as fuel pump 19 shown in FIG. 1, based on desired injection pressure. At step 128 of FIG. 2, a desired injection pressure (DIP) is preferably determined independently of the previously described pulse width times based on EGT and one or more engine operating parameters, such as engine RPM. For a common rail system, the DIP is the desired fuel pressure in the rail. Preferably, the DIP is located in a look-up table referenced by EGT and engine RPM. Furthermore, the look-up table is preferably based on steady-state engine operation. At step 130, a pump output signal is generated for controlling the fuel pump 19, or other fuel pump system, and the pump output signal is based on the difference between the DIP and observed or actual fuel pressure. Additional details regarding controlling fuel pressure based on desired injection pressure may be found in U.S. patent application Ser. No. 08/867,695, now U.S. Pat. No. 6,016,791, which is assigned to the assignee of the present invention and is hereby incorporated by reference.

Advantageously, because the DIP is preferably determined independently of the previously described pulse width times, the DIP may be adjusted independently to account for dynamic engine operating parameters such as engine acceleration mode, engine temperature, boost pressure associated with a turbo-charger, ambient air temperature, and ambient air pressure. For example, during a rapid acceleration mode, the air to fuel ratio may be too low (not enough air) to achieve optimal engine efficiency. Consequently, it may be desirable to lower the DIP in order to lower the actual injection pressure. As another example, for cold starting conditions, it may be desirable to again lower the DIP in order to lower the actual injection pressure so as to avoid excessive lowering of cylinder pressure caused by fuel evaporation.

Figure 3:
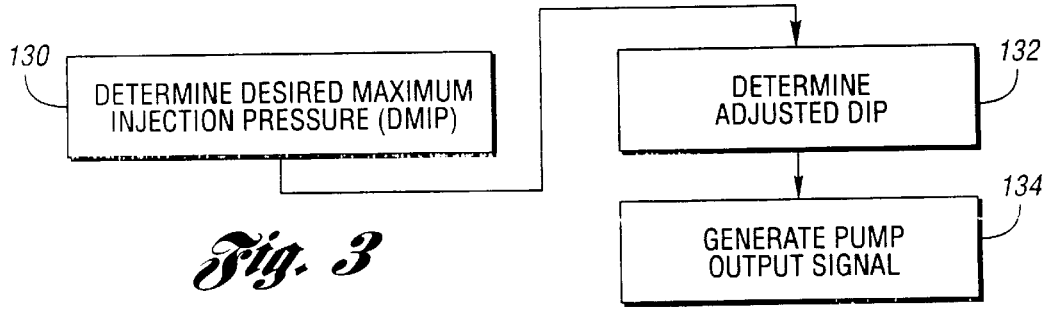
FIG. 3 is a flow chart illustrating a method according to the present invention for altering desired injection pressure based on dynamic engine operating parameters.

One method for adjusting the DIP is shown in FIG. 3. At step 130, a desired maximum injection pressure (DMIP) is determined based on EGT and one or more engine operating parameters, such as engine RPM. For a common rail system, the DMIP is the desired maximum fuel pressure in the rail. At step 132, a suitable adjustment factor is then applied to the DIP to determine an adjusted DIP that is limited by the DMIP and is based on dynamic engine operating parameters. For example, the adjustment factor may be used to interpolate between the DIP and the DMIP in order to determine the adjusted DIP. For certain engine operating parameters, such as high engine temperature, the adjustment factor may also trigger a discrete value for the adjusted DIP for engine protection purposes, failure mode recovery, and the like. Alternatively, the DIP may be adjusted in any suitable manner to account for dynamic engine operating parameters. Next, a pump output signal is generated at step 134 for controlling the fuel pump 19, or other fuel pump system, and the pump output signal is based on the difference between the adjusted DIP and the actual fuel pressure Because desired injection pressures can be adjusted based on dynamic engine operating parameters, control of a fuel pump system can be optimized so as to provide optimal fuel pressure. Consequently, engine performance and efficiency are improved, and exhaust emissions are reduced compared with prior systems and methods.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling fuel delivery from a fuel injector, the method comprising:

determining a proposed first pulse width time;

determining a proposed first quantity of fuel to be delivered by the fuel injector based on the proposed first pulse width time;

determining a desired total quantity of fuel to be delivered by the fuel injector;

comparing the proposed first quantity of fuel with the desired total quantity of fuel; and utilizing the proposed first pulse width time to control the fuel injector if the proposed first quantity of fuel is less than or equal to the desired total quantity of fuel.

2. The method of claim 1 wherein determining a proposed first pulse width time is performed independently of angular measurements associated with an engine crankshaft.

3. The method of claim 1 further comprising determining engine speed, and wherein the step of determining a proposed first pulse width time includes determining the proposed first pulse width time based on the engine speed.

4. The method of claim 1 further comprising determining an injection pressure, and wherein the step of determining a proposed first quantity of fuel includes determining the proposed first quantity of fuel based on the injection pressure.

5. The method of claim 4 wherein determining injection pressure comprises determining fuel pressure in a fuel rail connected to the fuel injector.

6. The method of claim 1 further comprising determining engine speed, and determining a desired engine torque output, and wherein the step of determining a desired total quantity of fuel includes determining the desired total quantity of fuel based on the engine speed and the desired engine torque output.

7. The method of claim 1 further comprising determining a desired first quantity of fuel to be delivered by the fuel injector, and determining a desired first pulse width time based on the desired first quantity of fuel if the proposed first quantity of fuel is greater than the desired total quantity of fuel, and utilizing the desired first pulse width time to control the fuel injector.

8. The method of claim 1 further comprising determining a desired second quantity of fuel to be delivered by the fuel injector if the proposed first quantity of fuel is less than the desired total quantity of fuel, and determining a second pulse width time based on the desired second quantity of fuel.

9. The method of claim 8 further comprising determining engine speed and determining a desired engine torque output, wherein determining a desired total quantity of fuel comprises determining the desired total quantity of fuel based on the engine speed and the desired engine torque output, and wherein the step of determining a desired second quantity of fuel includes determining the desired second quantity of fuel by subtracting the proposed first quantity of fuel from the desired total quantity of fuel.

10. The method of claim 8 further comprising determining an injection pressure, and wherein the step of determining a second pulse width time includes determining the second pulse width time based on the injection pressure.

11. The method of claim 1 further comprising determining a desired injection pressure independently of determining the proposed first pulse width time, determining actual injection pressure, and controlling a fuel pump system based on the difference between the desired injection pressure and actual injection pressure.

12. The method of claim 11 further comprising determining a desired acceleration mode, and modifying the desired injection pressure based on the desired acceleration mode.

13. The method of claim 11 further comprising determining an engine temperature, and modifying the desired injection pressure based on the engine temperature.

14. A method for controlling fuel delivery from a fuel injector, the method comprising:
   determining engine speed;
   determining a proposed pilot pulse width time based on engine speed;
   determining injection pressure;
   determining a proposed first quantity of fuel to be delivered by the fuel injector based on the proposed pilot pulse width time and injection pressure;
   determining a desired engine torque output;
   determining a desired total quantity of fuel to be delivered by the fuel injector based on the desired engine torque output and engine speed;
   comparing the proposed first quantity of fuel with the desired total quantity of fuel;
   determining a desired first quantity of fuel to be delivered by the fuel injector based on the desired engine torque output and engine speed if the proposed first quantity of fuel is greater than the desired total quantity of fuel;
   determining a desired pilot pulse width time based on the desired first quantity of fuel and the injection pressure;
   determining a desired second quantity of fuel to be delivered by the fuel injector by subtracting the proposed first quantity of fuel from the desired total quantity of fuel if the proposed first quantity of fuel is less than or equal to the desired total quantity of fuel; and
   determining a main pulse width time based on the desired second quantity of fuel and the injection pressure.

15. A system for controlling fuel delivery from a fuel injector having an electronic control valve, the fuel injector being in communication with a fuel rail, the system comprising:
   a crankshaft sensor for sensing rotational speed of the crankshaft;
   a fuel pressure sensor for measuring fuel pressure in the fuel rail;
   a controller in communication with the crankshaft sensor, the fuel pressure sensor and the electronic control valve, the controller including instructions for determining a desired engine torque output, instructions for determining engine speed based on the rotational speed of the crankshaft, instructions for determining a proposed first pulse width time, instructions for determining a proposed first quantity of fuel to be delivered by the fuel injector based on the proposed first pulse width time, instructions for determining a desired total quantity of fuel to be delivered by the fuel injector, instructions for comparing the proposed first quantity of fuel with the desired total quantity of fuel, and instructions for utilizing the proposed first pulse width time for controlling the fuel injector if the proposed first quantity of fuel is less than or equal to the desired total quantity of fuel.

16. A computer readable storage medium having information stored thereon representing instructions executable by an engine controller to control fuel delivery from a fuel injector having an electronic control valve, the fuel injector being in communication with a fuel rail, the computer readable storage medium comprising:
   instructions for determining a proposed first pulse width time;
   instructions for determining a proposed first quantity of fuel to be delivered by the fuel injector based on the proposed first pulse width time;
   instructions for determining a desired total quantity of fuel to be delivered by the fuel injector;
   instructions for comparing the proposed first quantity of fuel with the desired total quantity of fuel; and
   instructions for utilizing the proposed first pulse width time to control the fuel injector if the proposed first quantity of fuel is less than or equal to the desired total quantity of fuel.

17. The computer readable storage medium of claim 16 wherein instructions for determining a proposed first pulse width time includes instructions for determining the proposed first pulse width time independently of angular measurements associated with an engine crankshaft.

18. The computer readable storage medium of claim 16 further comprising instructions for determining engine speed, and wherein instructions for determining a proposed first pulse width time includes instructions for determining the proposed first pulse width time based on the engine speed.

19. The computer readable storage medium of claim 16 further comprising instructions for determining fuel pressure in the fuel rail, and wherein instructions for determining a proposed first quantity of fuel includes instructions for determining the proposed first quantity of fuel based on the fuel pressure.

20. The computer readable storage medium of claim 16 further comprising instructions for determining engine speed, and instructions for determining a desired engine torque output, and wherein instructions for determining a desired total quantity of fuel includes instructions for determining the desired first quantity of fuel based on the engine speed and the desired engine torque output.

21. The computer readable storage medium of claim 16 further comprising instructions for determining a desired first quantity of fuel to be delivered by the fuel injector, and instructions for determining a desired first pulse width time based on the desired first quantity of fuel if the proposed first quantity of fuel is greater than the desired total quantity of fuel, and instructions for utilizing the desired first pulse width time to control the fuel injector.

22. The computer readable storage medium of claim 16 further comprising instructions for determining a desired second quantity of fuel to be delivered by the fuel injector if the proposed first quantity of fuel is less than the desired total quantity of fuel, and instructions for determining a second pulse width time based on the desired second quantity of fuel.

23. The computer readable storage medium of claim 22 further comprising instructions for determining engine speed and instructions for determining a desired engine torque output, wherein instructions for determining a desired total quantity of fuel includes instructions for determining the desired total quantity of fuel based on the engine speed and the desired engine torque output, and wherein instructions for determining a desired second quantity of fuel includes instructions for determining the desired second quantity of fuel by subtracting the proposed first quantity of fuel from the desired total quantity of fuel.

24. The computer readable storage medium of claim 22 further comprising instructions for determining an injection pressure, and wherein the step of determining a second pulse width time includes determining the second pulse width time based on the injection pressure.

25. The computer readable storage medium of claim 16 further comprising instructions for determining a desired injection pressure independently of determining the proposed first pulse width time, instructions for determining fuel pressure in the fuel rail, and instructions for controlling a fuel pump system based on the difference between the desired injection pressure and the fuel pressure in the fuel rail.

26. The computer readable storage medium of claim 25 further comprising instructions for determining a desired acceleration mode, and instructions for modifying the desired injection pressure based on the desired acceleration mode.

27. The computer readable storage medium of claim 25 further comprising instructions for determining an engine temperature, and instructions for modifying the desired injection pressure based on the engine temperature.

* * * * *